United States Patent [19]

Kitts, Jr.

[11] 4,263,359

[45] Apr. 21, 1981

[54] CHARGE RECEPTOR FILM FOR CHARGE TRANSFER IMAGING

[75] Inventor: Earle L. Kitts, Jr., West Chester, Pa.

[73] Assignee: E. I. Du Pont de Nemours and Company, Wilmington, Del.

[21] Appl. No.: 27,443

[22] Filed: Apr. 5, 1979

[51] Int. Cl.[3] ........................ B32B 3/14; G01D 15/06; G03G 5/02

[52] U.S. Cl. ................................ 428/195; 346/135.1; 346/153.1; 427/108; 428/209; 428/332; 428/339; 428/458; 428/480; 428/913; 430/33

[58] Field of Search .................. 96/1 TE; 250/315 R, 250/315 A, 315.1, 315.2; 346/135, 153, 135.1; 427/13–15, 19, 108, 256, 287; 428/195, 209, 210, 332–339, 458, 469, 480, 913; 430/31, 33

[56] References Cited

U.S. PATENT DOCUMENTS

| | | | |
|---|---|---|---|
| 2,825,814 | 3/1958 | Walkup | 427/19 X |
| 3,519,819 | 7/1970 | Gramza et al. | 96/1 TE X |
| 3,730,710 | 5/1973 | Ohta | 96/1 TE |
| 3,772,010 | 11/1973 | Weiss | 96/1 TE |
| 3,997,343 | 12/1976 | Weigl et al. | 96/1 TE X |

*Primary Examiner*—Bruce H. Hess

[57] ABSTRACT

A charge receptor film element for charge transfer imaging comprising, in order, (a) support, e.g., transparent film, (b) conductive layer, e.g., metal, metal oxide, ammonium chloride salt, (c) thin dielectric layer bearing, e.g., transparent polyethylene terephthalate, (d) opaque dots, e.g., 3 to 50 micrometers in height, covering less than 10% of the total area of layer (c) which provide less than 0.05 background optical density. The element is useful for medical radiography, in eletrophotography, electrostatic printing, etc.

13 Claims, 5 Drawing Figures

CHARGE RECEPTOR FILM FOR CHARGE TRANSFER IMAGING

DESCRIPTION

TECHNICAL FIELD

This invention relates to charge receptor film elements. More particularly this invention relates to charge receptor film elements for use in charge transfer imaging.

BACKGROUND ART

In a typical known charge transfer process a photoconductive layer on a conductive substrate is situated in close proximity to a dielectric receiving layer, also present on a conducting substrate. When a sufficiently high voltage is applied between the two substrates, a dielectric breakdown occurs in the very small air gap between the two substrates, allowing charge transfer from the photoconductive layer to the dielectric receiving layer. Typically just prior to imaging, the system is biased with a voltage just below that required for the air-gap breakdown. Upon imagewise exposure, photocarriers, i.e., electrons and/or holes generated by the absorption of photons, created in the imaged areas of the photoconductive layer migrate in the applied field to increase the voltage across the air gap imagewise. Thus there is an imagewise transfer of charge across the gap from the photoconductive layer to the receiving layer. The electrostatic latent image on the receiving layer is then toned to develop the image.

To obtain good quality images it is desirable during the transfer step, to maintain a precise air gap between the photoconductive and receiving layers. Air gap separations of the order of a few microns are generally desirable. If the gap is too large, little or no charge will transfer; while if it is too small, there can be considerable transfer of charge in the background areas resulting in a mottled background. In addition, because the relationship between the voltage needed to cause dielectric breakdown in the air gap and the air gap spacing (the Paschen curve) is not constant, a uniform air gap spacing is desirable for high quality transfer images.

U.S. Pat. No. 2,825,814 teaches a method for maintaining spacing by placing between the surfaces of the photoconductive and receiving layers a small quantity of powdered resin or plastic which is obtained by grinding the material to a relatively uniform particle size. Disadvantages of this technique are: (1) the dusted particles tend to adhere to both surfaces after the charge transfer operation is complete and the surfaces are separated; (2) upon toning, the final image areas often contain blotches caused by the presence of the particles used to maintain the spacing; (3) the resin particles are not of uniform size and thus the spacing is not uniform; and (4) the particles used for spacing move slightly if utmost care is not taken when the two layers are separated after transfer of a latent or developed image. These disadvantages result in poor transferred images upon toning.

U.S. Pat. No. 3,519,819 discloses maintaining spacing by coating on a suitable substrate, e.g., paper, a thin layer of electrically insulating, solid, film forming polymeric binder containing particulate spacer particles randomly dispersed throughout the layer and embedded therein, e.g., substantially inert particles of various inorganic or organic materials. These particles are embedded in the polymer binder layer in such a manner that a portion of each protrudes above the surface of the layer. The amount by which these spacer particles protrude determines the air gap thickness. However, because the particle size distribution of the spacer particles is random and each particle is not deposited in the same orientation within the binder, the amount by which each particle protrudes above the substrate is not uniform. Particles deeply embedded in the binder would not be effective as spacers, while particles loosely embedded can become dislodged during use. Even when apparently uniformly sized spherical particles are used, the particles can become dislodged. If the particles are too closely spaced image clarity can be affected. Thus a uniform air gap cannot be achieved readily.

BRIEF DESCRIPTION OF DRAWINGS

In the accompanying drawings forming a material part of this disclosure

DISCLOSURE OF INVENTION

In accordance with this invention there is provided a charge receptor film element for charge-transfer imaging which comprises, in order, (a) a support,
(b) a conductive layer,
(c) a thin dielectric layer bearing
(d) substantially uniformly sized and spaced opaque dots covering less than 10% of the total area of layer (c), the opaque dots providing less than 0.05 background optical density and having a height of at least 3 micrometers.

Figure 1:
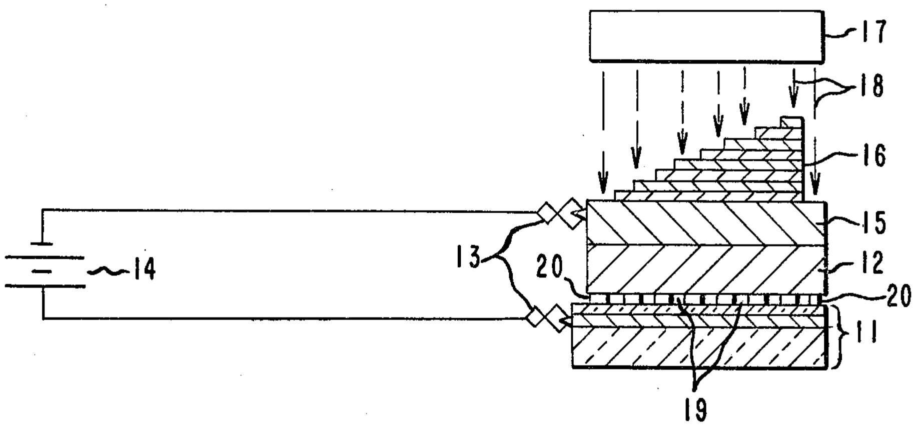
FIG. 1 is a diagrammatic view of an apparatus illustrating the employment of a charge receptor film element of the invention.

Referring to the drawings, and more particularly to FIG. 1, the charge receptor film element of the invention is shown in an apparatus wherein an electrostatic charge is transferred to the charge receptor film element. The charge receptor film element 11 contains on one surface microdots 20 to provide a uniformly spaced air gap 19. A power source 14 is attached by clips 13 to both a conductive layer 15 attached to a photoconductive layer 12 and to a conductive layer in the charge receptor film element 11. As a result, a biasing voltage is maintained between the photoconductive layer 12 and the surface of element 11, and the air gap 19 is equal to the height of the microdots 20 prepared from a photopolymerized composition. Radiation 18 produced by a radiation source 17, e.g., X-ray source, is attenuated by an object being imaged which is illustrated in FIG. 1 by a regular step wedge 16. As a result of the radiation attenuation by step wedge 16, the radiation passes through conductive layer 15 and creates photocarriers in the photoconductive layer 12. The photocarriers migrate in the applied field to increase the voltage across the airgap 19 imagewise. When the sum of the biasing voltage and the imagewise voltage increase resulting from exposure are above the threshold value for the air gap 19 determined by the microdots 20, then electrostatic charge is transferred to the charge receptor film element 11. This latent electrostatic image can then be made visible by toning methods known in the art.

Figure 2:
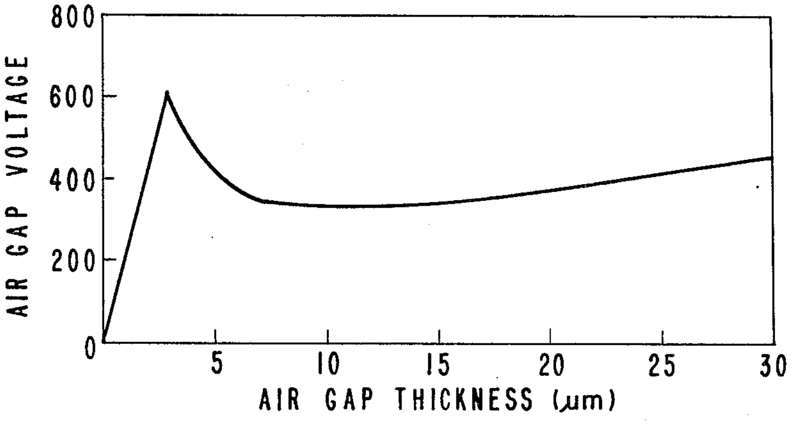
FIG. 2 is a graphical representation of a Paschen curve plotting air gap voltage against air gap thickness.

FIG. 2 illustrates the change which occurs in the critical air gap voltage and the corresponding air gap thickness. As can be seen, there is a portion of the Paschen curve where air gap voltage peaks, and it is in this region where a slight change in thickness could easily change the critical voltage by the order of 100 volts. Air is the medium in the gap. A new curve results when some other gas or mixture of gases is used.

Figure 3:
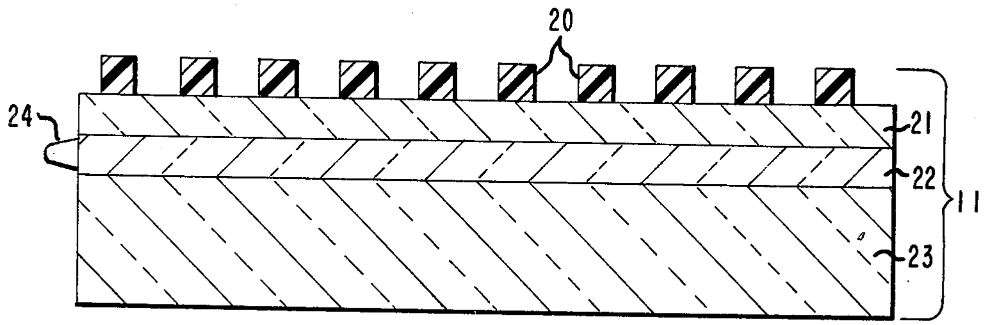
FIG. 3 is a diagrammatic view of a charge receptor film element embodiment of the invention.

In FIG. 3 a preferred charge receptor film element is shown which is a transparent element capable of electrostatic imaging and toning. The charge receptor film element comprises a transparent support 23, a transparent conductive layer 22, a transparent dielectric layer 21, and surface microdots 20. Provision is made for electrical contact 24, which can be an extension of conductive layer 22.

Figure 4:
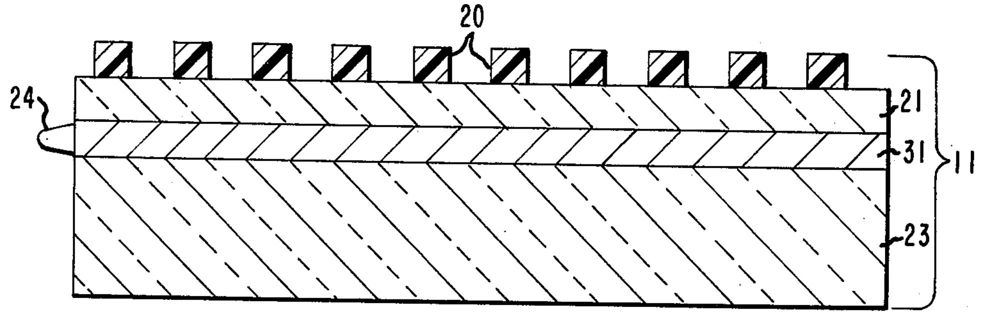
FIG. 4 is a diagrammatic view of a further charge receptor film element embodiment of the invention.

FIG. 4 shows an alternate charge receptor film element containing a metal conductive layer 31 wherein the element has only a useful reflection image after electrostatic imaging and toning. The charge receptor film element comprises a transparent support 23, an opaque metal conductive layer 31, a transparent dielectric layer 21, and surface microdots 20. Provision is made for electric contact 24, which can be an extension of 31.

Figure 5:
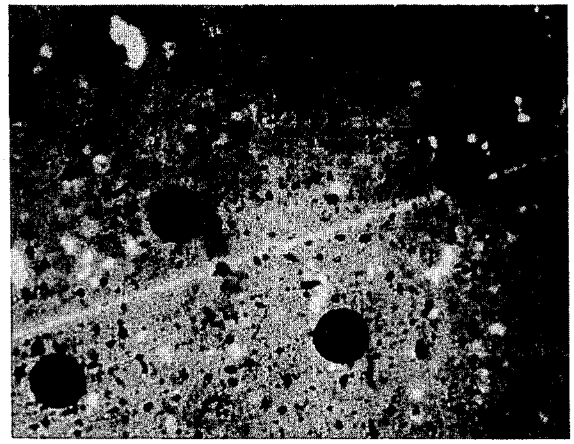
FIG. 5 is a photomicrograph of the microdots present on a charge receptor film of the invention.

FIG. 5 illustrates surface microdots which are preferably produced from a photopolymerizable composition.

Supports useful in the charge receptor element include glass, plastic films, e.g., polystyrene, cellulose acetate, cellulose triacetate, polyamides, polycarbonates, polyesters, etc. A biaxially stretched, heat set polyethylene terephthalate film is preferred. The thickness of the support ranges from 0.02 to 3.0 mm. A support thickness of 0.15 to 0.2 mm is preferred.

A conductive layer, which preferably is transparent, is present on the support. The conductive layer, which can be an electroconductive resin layer, can be applied by coating, laminating or other means known to the art. The conductive layer should possess as high a conductivity as possible although any material with a sheet resistance in the range of $10^9$ to $10^{-4}$ ohms/cm$^2$ is suitable. Polyquaternary salts of ammonium chloride described in U.S. Pat. No. 3,870,599 and polyvinylbenzyltrimethyl ammonium chloride compounds are useful. Also, a thin layer of metal or metal oxide, e.g., indium oxide, tin oxide, etc., can be used. The metal layer can be applied to the support by evaporation or sputtering methods. The metal layers can be transparent, e.g., in the range of up to $10^{-4}$ mm. The conductive layer, however, does not need to be transparent if the images are viewed by reflection. The conductive layer ranges in thickness from $10^{-8}$ to $10^{-1}$ mm.

The thin transparent dielectric layer is present on the supported conductive layer. In order to maximize charge transfer efficiency, the dielectric layer should be as thin as practicable, e.g., in the thickness range of 0.006 to 0.02 mm, as well as be highly insulating. Polyethylene terephthalate film is preferred although other films, e.g., polystyrene, cellulose acetate, etc. can be used. To insure intimate contact between the conductive layer and the dielectric layer, the latter layer is laminated to the support layer bearing the conductive layer. The films useful for the dielectric layer should not only be thin and transparent but be of uniform thickness without pinholes as well as have a high dielectric constant as possible with high insulating properties.

Over these three layers are fabricated microdots from a photopolymerizable composition. Preferably the photopolymerizable composition is applied by coating the dielectric layer and the coating is allowed to dry. The photopolymerizable film is then exposed imagewise to ultraviolet radiation from known ultraviolet-emitting sources, e.g., through an appropriate screen-tint mask, known in the graphic arts field, to polymerize a regular array of uniformly sized and spaced microdots. The unpolymerized areas of the photopolymerized layer are removed by solvent or aqueous washout, leaving hardened microdots on an otherwise smooth and preferably clear, transparent charge receptor surface. The dry thickness of the photopolymerizable coating is the relief height of the dots and is also the air gap separation. The air gap thickness can be determined by controlling the thickness of the photopolymerizable layer. Relief microdot heights range from about 3 to 50 micrometers. When air is present at the medium between the photoconductive layer 12 and the surface of the charge receptor element 11 as shown in FIG. 1, an optimum gap is about 7 micrometers. The optimum gap thickness varies as different gases or mixtures of gases are used. The optimum thickness can be determined from the Paschen curve characteristics of the particular gas or mixture of gases. Thus a charge receptor film element having an optimum gas thickness can be designed for any charge transfer system.

In addition to forming the photopolymerizable layer on the dielectric layer by coating, the microdot pattern can be applied directly by a transfer process or by a screen printing process. Alternatively, a photopolymerizable element in which the base support has the required thickness for use in the charge transfer film element of the invention can be laminated or otherwise bonded to the supported conductive layer.

The microdots formed, as described above, can cover about 2 to 10 percent of the total area of the thin dielectric layer of the charge receptor film element. Preferably the microdots cover less than 5, preferably 3 up to 5 percent of the area with spatial frequency of at least 150 dots per linear inch (59.05 dots per linear centimeter) at which frequency the dots barely can be resolved by the naked eye. Processes are known to reduce the size of a microdot pattern, e.g., by etching the microdots to obtain the suitable size and distribution requirements suitable for use in the charge transfer film element. Because an electric charge is not effectively transferred to the surface of the microdots, the photopolymerizable composition from which the dots are formed is loaded with pigment to render the dots opaque. Carbon black produces a background density of about 0.02 with 5 percent area coverage. Other colored pigments can be used, for example, to match the color of the toner. A background density of less than about 0.05 should be achieved.

A 95% negative halftone screen as commonly used in the graphic arts industry represents a preferred screen for use during exposure to produce the microdots. Such screens are described in Contact Screen Story, Du Pont Graphic Arts Technical Service, Photo Products Department, Wilmington, Delaware, 1972, pp. 10 to 41. Other screens can be used. However, if dot concentration is increased, the background density will also increase. At a 5 percent microdot coverage, if the pigment is omitted from the photopolymer composition, the top optical density upon toning is a maximum value of 1.3.

Substantially any photopolymerizable compositions which polymerize upon exposure to radiation, e.g., ultraviolet light, can be used to fabricate the microdots. These compositions contain additional polymerizable, ethylenically unsaturated monomers, organic polymeric binders, photoinitiators as well as other known additives. Photopolymerizable compositions listed in Celeste U.S. Pat. No. 3,469,982; Plambeck U.S. Pat. No. 2,760,863; Schoenthaler U.S. Pat. No. 3,418,295 and Belgian Patent No. 848,409, etc. are useful.

BEST MODE FOR CARRYING OUT THE INVENTION

The best mode is illustrated in Example 2 wherein the charge receptor film element is transparent in the non-imaged areas after toning.

INDUSTRIAL APPLICABILITY

The charge receptor film element is useful for charge transfer imaging. The charge receptor film element is very versatile, since an optimum gap thickness for any gas or combination of gases can be easily achieved. The film element is particularly useful for medical radiography but can be used in electrophotography, electrostatic printing, etc. The film element provides the precise roughness control required for charge transfer imaging with the sensitivity and high quality needed for radiography and other high-quality charge transfer imaging applications.

EXAMPLES

The following examples illustrate the invention.

EXAMPLE 1

A charge receptor film element 11 prepared as follows: biaxially stretched heat set polyethylene terephthalate of 0.178 mm thickness and of a quality suitable for use with photographic emulsion coating is selected as the transparent support. A 30% solution of polyvinylbenzyltrimethyl ammonium chloride, ECR Electroconductive Resin, Dow Chemical Company, is coated on the support using a 0.051 mm doctor knife and is allowed to dry. A 0.019 mm film of biaxially stretched, heat set polyethylene terephthalate is then laminated on top of the conductive resin coating using a lamination apparatus having two rubber rolls under a pressure of 5 kg/cm$^2$.

A photopolymer composition is prepared containing the following components:

| Component | Amount (g) |
|---|---|
| Methylene chloride | 2880.0 |
| Ethyl Cellosolve | 320.0 |
| Triethyleneglycol dimethacrylate | 153.6 |
| Trimethylolpropane triacrylate | 18.4 |
| Orthochlorohexaarylbisimidazole | 69.6 |
| Michler's Ketone | 34.4 |
| 1:1 copolymer of styrene and maleic anhydride, partially esterified with isopropyl alcohol, mol wt. ca. 1700, acid number ca. 270 | 269.6 |
| Colloidal carbon (45% by weight) mixed into a copolymer composition comprising methyl methacrylate/(37)/ethyl methacrylate/(56)/ acrylic acid/(7)/having an acid number of 76 to 85 and a molecular weight of about 260,000 | 253.6 |

The composition compound is coated on the 0.019 mm thick polyethylene terephthalate film with a 0.102 mm doctor knife to give a coating of about 11.4 micrometers thickness. The photopolymer layer is protected with a cover sheet and is exposed to ultraviolet radiation source, 2 kilowatt pulsed xenon lamp for 15 seconds at a distance of 233 mm through a 95% Halftone Magenta screen. The cover sheet is removed and the imagewise exposed photopolymer layer is developed with a 3% solids solution of nine parts sodium carbonate and one part sodium bicarbonate. This results in a 5% microdot pattern having an optical density of 0.02. A portion of a selenium drum from a Xerox ® machine is used as the photoconductive layer 12 and conductive substrate 15 as illustrated in FIG. 1. The charge receptor film element 11 is positioned under the selenium photoconductive layer 12 so that the microdots 20 on the surface of the charge receptor film 11 determine the air gap 19. Clip leads 13 are used to provide electrical contact with the conductive substrate 15 above the photoconductive layer 12 and also with the transparent electroconductive resin layer 22 shown in greater detail in FIG. 3. A direct current source 14 is used to supply a bias voltage of 1200 volts. An opaque, variable density target 16 is positioned on top of the conductive substrate 15 and a Faxitron ® X-ray exposure unit 17 is used to produce X-rays 18. The exposure conditions involve using 3 mm aluminum filtration for 5 seconds at 70 KVP.After toning of the exposed charge receptor film 11, useful images are produced in which grey scale differences are reproduced. This example illustrates that the instant invention yields practical and useful results using an exposure within current medical radiography practice.

EXAMPLE 2

Several charge receptor films are fabricated and tested as described in Example 1 except that instead of applying the photopolymerizable compositions with a doctor knife the compositions are mechanically applied with a Talboy ® coater to provide a quantity of higher quality material. FIG. 5 shows a magnified view of the 5% microdots produced with the film prepared.

EXAMPLE 3

A charge receptor film, as illustrated in FIG. 4, is prepared from the transparent support described in Example 1, an electrically conductive layer 31 and a transparent dielectric layer 21. Electrically conductive layer 31 is aluminum, $\sim 10^{-3}$ mm in thickness which is vacuum deposited onto a polyethylene terephthalate film 0.025 mm in thickness. A photopolymerizable composition is prepared containing the following components:

| Component | Amount (g) |
|---|---|
| Methylene chloride | 285.1 |
| Ethyl Cellosolve | 31.7 |
| Triethyleneglycol dimethacrylate | 20.0 |
| Trimethanolpropane triacrylate | 4.0 |
| Orthochlorohexaarylbisimidazole | 4.8 |
| Michler's Ketone | 3.4 |
| 1:1 copolymer of styrene and | |

-continued

| Component | Amount (g) |
|---|---|
| maleic anhydride, partially esterified with isopropyl alcohol, mol. wt. ca. 1700, acid number ca. 270 | 32.0 |
| Copolymer composition as described in Example 1 | 16.0 |

The composition is coated over the dielectric layer 21 with a 0.051 mm doctor knife and is air dried. The dry photopolymer layer is covered with a 0.0128 mm polyethylene terephthalate cover sheet. A microdot pattern is fabricated by ultraviolet exposure through a 5% transmission 150 line Halftone Magenta screen as described in Example 1. The cover sheet is removed and the unexposed image areas are developed as described in Example 1.

Tests of charge receptor films are made using a bias voltage of 1200 volts and an X-ray source voltage of 70 KVP. The results are illustrated in Table 1.

TABLE 1

| Film Used | Exposure (seconds) | Gas In Gap | Image Obtained |
|---|---|---|---|
| Plain aluminized | 20 | Air | No visible image |
| Plain aluminized | 60 | Air | Barely discernible |
| Plain aluminized | 20 | Fluorocarbon | Clear image, but relatively high background density |
| 5% microdots on aluminized | 20 | Air | Sharp image with grey scale |
| 5% microdots on aluminized | 10 | Air | Clearly discernible image |
| 5% microdots on aluminized | 5 | Air | Barely discernible |

The advantage of maintaining uniform contact is illustrated by the sharper images obtained using films of the invention.

EXAMPLE 4

The same photopolymerizable composition and aluminized film is used as described in Example 3 except that a 0.102 mm doctor knife coating is applied to give a 11.4 micrometers height microdot. With this thinner photopolymer coating a sharp image is obtained with a 20 second exposure and a discernible image with a 5 second exposure. A coating thickness increase results in a different response from the thinner elements tested in Table 1.

I claim:

1. A charge receptor film element for charge-transfer imaging which comprises, in order,
   (a) a support,
   (b) a conductive layer,
   (c) a thin transparent dielectric layer bearing
   (d) substantially uniformly sized and spaced opaque polymerized non-conductive dots covering less than 10% of the total area of layer (c), the opaque dots providing less than 0.05 background optical density and having a height of at least 3 micrometers.

2. A charge receptor film element according to claim 1 wherein the support is a transparent film.

3. A charge receptor film element according to claim 2 wherein the transparent film is polyethylene terephthalate.

4. A charge receptor film element according to claim 1 wherein the conductive layer is a transparent electroconductive resin layer.

5. A charge receptor film element according to claim 4 wherein the electroconductive resin layer is polyvinylbenzyltrimethyl ammonium chloride.

6. A charge receptor film element according to claim 1 wherein the conductive layer is transparent metal or metal oxide layer.

7. A charge receptor film element according to claim 6 wherein the conductive layer is an aluminum layer.

8. A charge receptor film element according to claim 1 wherein the transparent dielectric layer is a polyethylene terephthalate film.

9. A charge receptor film element according to claim 1 wherein the opaque dots are formed from a photopolymerizable layer, 3 micrometers to 50 micrometers in thickness.

10. A charge receptor film element according to claim 9 wherein the opaque dots are photopolymerized dots containing carbon black pigment.

11. A charge receptor film element for charge-transfer imaging which comprises, in order,
    (a) a transparent film support,
    (b) a transparent electroconductive layer, $10^{-8}$ to $10^{-1}$ mm in thickness, having an electrical resistance in the range of $10^9$ to $10^{-4}$ ohms/cm$^2$,
    (c) a thin transparent dielectric film layer, about 0.0064 to 0.019 mm in thickness, bearing
    (d) substantially uniformly sized and spaced opaque polymerized non-conductive microdots covering less than 5% of the total area of layer (c), the opaque dots providing 0.02 background optical density and having a height of about 7 micrometers.

12. A charge receptor film element according to claim 11 wherein layers (a) and (c) are polyethylene terephthalate films.

13. A charge receptor film element according to claim 12 wherein the transparent electroconductive layer is a resin layer of polyvinylbenzyltrimethyl ammonium chloride.

* * * * *